United States Patent [19]

Suzuki et al.

[11] Patent Number: 5,469,552
[45] Date of Patent: Nov. 21, 1995

[54] PIPELINED DATA PROCESSOR HAVING COMBINED OPERAND FETCH AND EXECUTION STAGE TO REDUCE NUMBER OF PIPELINE STAGES AND PENALTY ASSOCIATED WITH BRANCH INSTRUCTIONS

[75] Inventors: Masato Suzuki; Tokuzo Kiyohara, both of Osaka, Japan

[73] Assignee: Matsushita Electric Industrial Co., Ltd., Osaka, Japan

[21] Appl. No.: 310,627

[22] Filed: Sep. 22, 1994

Related U.S. Application Data

[63] Continuation of Ser. No. 795,337, Nov. 20, 1991, abandoned.

[30] Foreign Application Priority Data

Nov. 21, 1990 [JP] Japan .................... 2-319008

[51] Int. Cl.$^6$ ................. G06F 9/38; G06F 9/30
[52] U.S. Cl. ................... 395/375; 364/DIG. 1; 364/231.8; 364/261.3; 364/261.6
[58] Field of Search ............................... 395/375

[56] References Cited

U.S. PATENT DOCUMENTS

| | | | |
|---|---|---|---|
| 4,521,851 | 6/1985 | Trubisky et al. | 395/375 |
| 4,733,344 | 3/1988 | Watanabe et al. | 395/375 |
| 4,763,294 | 8/1988 | Fong | 364/748 |
| 4,858,105 | 8/1989 | Kuriyama et al. | 395/375 |
| 4,879,676 | 11/1989 | Hansen | 364/748 |
| 4,928,223 | 5/1990 | Dao et al. | 395/375 |
| 5,129,068 | 7/1992 | Watamabe et al. | 395/400 |
| 5,155,817 | 10/1992 | Kishigami et al. | 395/375 |
| 5,193,158 | 3/1993 | Kinney et al. | 395/375 |
| 5,212,779 | 5/1993 | Saito | 395/375 |
| 5,226,166 | 7/1993 | Ishida et al. | 395/800 |
| 5,233,694 | 8/1993 | Hotta et al. | 395/375 |
| 5,239,633 | 8/1993 | Terayama et al. | 395/375 |
| 5,241,635 | 8/1993 | Papadopoulos et al. | 395/375 |

FOREIGN PATENT DOCUMENTS

| | | |
|---|---|---|
| 2-42534 | 2/1990 | Japan . |
| 1148471 | 4/1966 | United Kingdom . |
| 0377990A2 | 12/1989 | WIPO . |
| 0377990A3 | 12/1989 | WIPO . |

OTHER PUBLICATIONS

Motorola Semiconductor Products Inc., pp. 12, 21–25, 1984.

*Primary Examiner*—Krisna Lim
*Attorney, Agent, or Firm*—Price, Gess & Ubell

[57] ABSTRACT

A data processing apparatus having a pipelined architecture, includes an instruction fetch unit for fetching an instruction from a memory; an instruction decode unit for decoding the instruction fetched by the instruction fetch unit, and outputting fetch control data regarding operand fetching and operation control data regarding execution of the instruction; an execution unit for receiving the execution control data directly from the instruction decode unit, and executing a predetermined operation based on the operation control data; and an operand fetch unit for receiving the fetch control data directly from the instruction decode unit, and fetching an operand from a source other than registers in the execution unit. The operand fetch unit fetches the operand concurrently with processing in a second cycle, and subsequent cycles if any, of the operation executed by the execution unit and requiring at least two machine cycles for execution.

33 Claims, 11 Drawing Sheets

← 1st halfword → ← 2nd halfword →

← halfword →

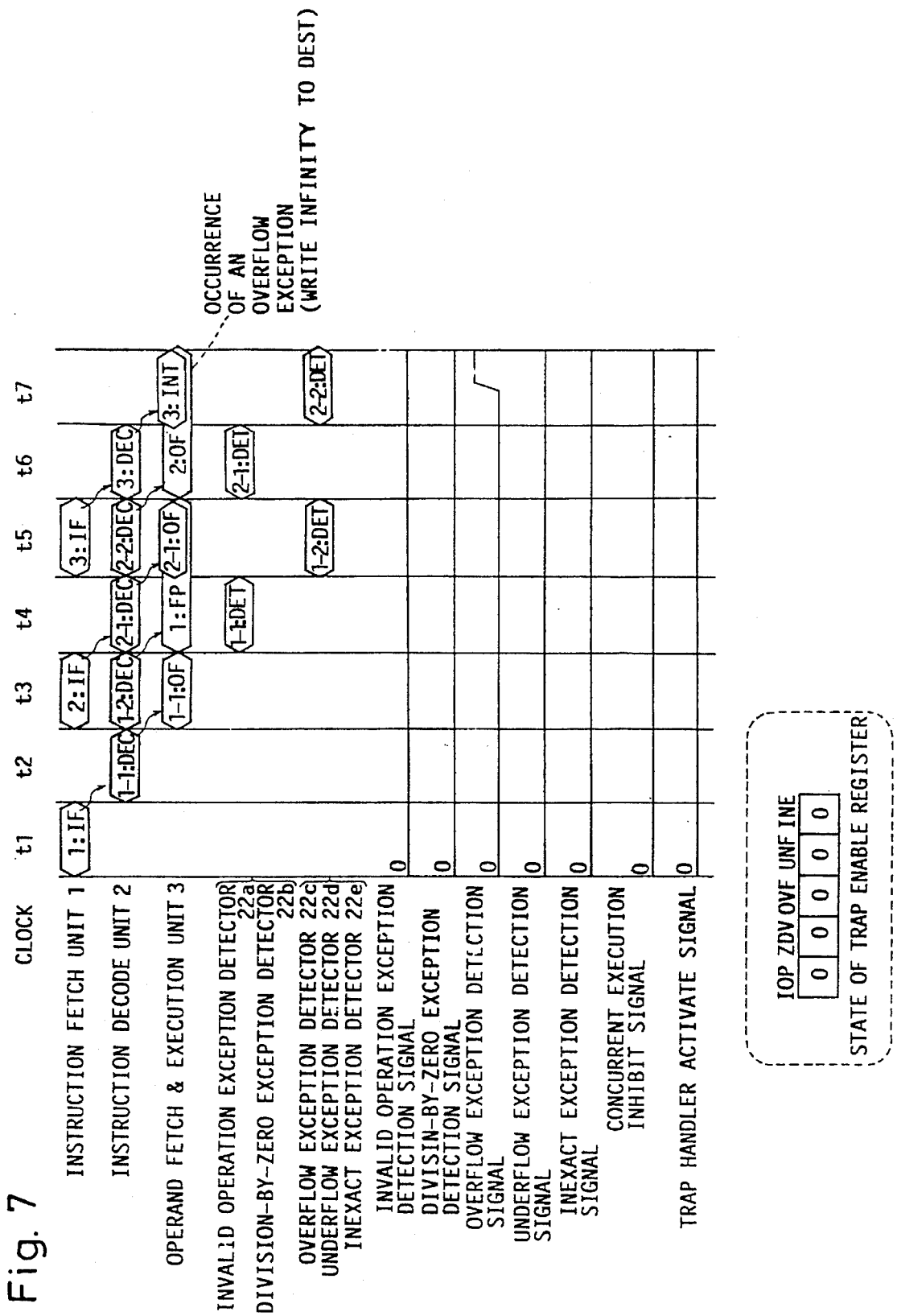

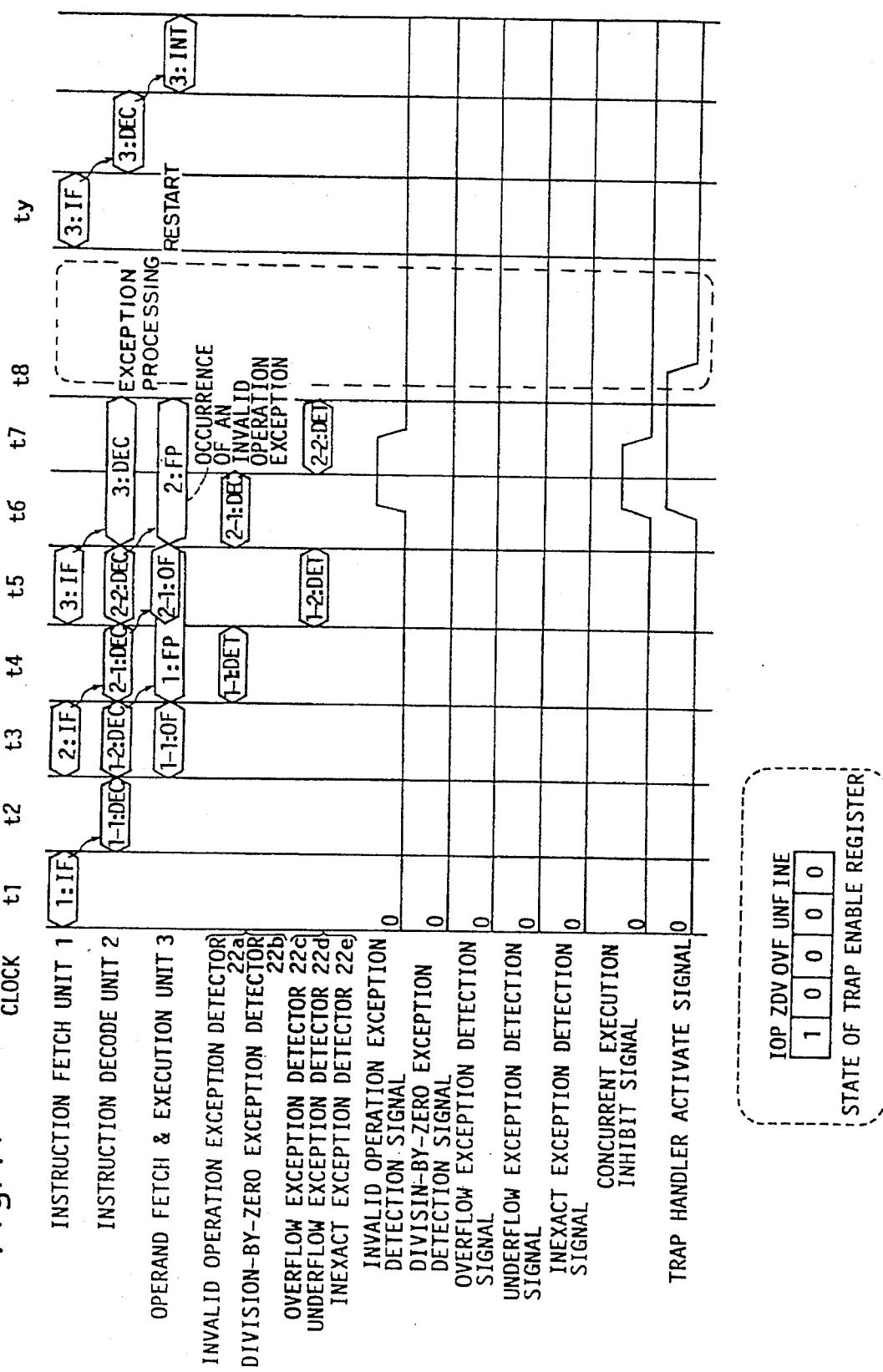

PIPELINED DATA PROCESSOR HAVING COMBINED OPERAND FETCH AND EXECUTION STAGE TO REDUCE NUMBER OF PIPELINE STAGES AND PENALTY ASSOCIATED WITH BRANCH INSTRUCTIONS

This is a continuation of application Ser. No. 07/795,337, filed on Nov. 20, 1991, now abandoned.

BACKGROUND OF THE INVENTION

1. Field of the Invention

The present invention relates to a data processing apparatus and data processing method for use in a digital computer or the like, and more particularly to a data processing apparatus having a pipelined architecture for concurrently carrying out instruction fetching and decoding and so on, and a data processing method used in the data processing apparatus having the pipelined architecture.

2. Description of the Related Art

A conventional data processing apparatus having a pipelined architecture is disclosed in Japanese Patent Publication Laying-Open No. 1990-42534, for example. FIG. 1 shows a block diagram of the conventional data processing apparatus. It is to be noted that this block diagram is a modified version of the original diagram included in the above publication, to clarify the differences between the conventional apparatus and an apparatus according to the present invention.

In FIG. 1:

Numeral 51 denotes an instruction fetch unit for fetching instruction codes stored in a memory not shown.

Numeral 52 denotes an instruction decode unit for decoding the instruction codes fetched and outputting control data.

Numeral 53 denotes an operand fetch unit for fetching operands stored in a memory or I/O device not shown (hereinafter referred to as external operands).

Numeral 54 denotes an execution unit including arithmetic units such as a floating-point unit 54a and an integer unit 54b having general registers or floating-point data registers, not shown, for carrying out floating-point operations and integer operations.

Numeral 55 denotes an operand store unit for writing the external operands, that is writing results of operations to a memory or I/O device. Details and operations of the operand store unit 55 will be omitted from the following description.

Numeral 56 denotes an I/O bus for connecting the data processing apparatus to the memory, I/O device and the like.

Numeral 57 denotes a bus control unit for arbitrating an instruction code fetch request from the instruction fetch unit 51, an external operand fetch request from the operand fetch unit 53, and an external operand write request from the operand store unit 55 and controlling the I/O bus 56.

Numeral 58 denotes pipeline control unit for controlling the units 51–55.

The instruction decode unit 52, specifically, decodes an instruction code fetched by the instruction fetch unit 54, and outputs a control data regarding execution of an operation (hereinafter referred to as operation control data) to the operand fetch unit 53. When the decoded data shows a necessity for fetching an external operand, the instruction decode unit 52 computes an operand address and outputs a control data regarding external operand fetching (hereinafter referred to as fetch control data), along with the operation control data, to the operand fetch unit 53.

When a fetch control data and an operation control data are outputted from the instruction decode unit 52, the operand fetch unit 53 fetches an external operand based on an operand address included in the fetch control data, and transmits the external operand fetched and the operation control data received from the instruction decode unit 52 to the execution unit 54. When only an operation control data is outputted from the instruction decode unit 52, the operand fetch unit 53 transmits only this operation control data to the execution unit 54.

The execution unit 54 carries out floating-point operations and integer operations based on the operation control data received from the operand fetch unit 53 and using the external operands fetched by the operand fetch unit 53 and/or operands stored in the general registers or floating-point data registers described later (hereinafter referred to as register operands). Results of the operations are stored in the general registers or floating-point data registers, or outputted to the operand store unit 55 for writing to the memory or the like.

The following numbers of clock cycles are required for the foregoing units 51–54 to carry out a single process (with one machine cycle assumed to be one clock cycle):

(a) one clock cycle per word (32 bits) for the instruction fetch unit 51, (b) one clock cycle per halfword (16 bits) for the instruction decode unit 52, (c) one clock cycle per one operand fetch for the operand fetch unit 53. (However, one clock is required to transmit the operation control data to the execution unit 54 even when an external operand is not fetched.)

(d) two clock cycles per floating-point operation to be executed, and one clock cycle per integer operation to be executed, for the execution unit 54. (However, the floating-point operation and integer operation may be executed concurrently.)

The instructions executed by the data processing apparatus have formats as shown in FIGS. 6(a) and (b), for example.

The instruction in the format shown in FIG. 6(a) has a length of two halfwords. The first halfword is composed of an operation code OP1 and a source operand addressing designation SRC. The second halfword is composed of an operation code OP2 and a destination operand addressing designation DEST.

The instruction in the format shown in FIG. 6(b) has a length of one halfword, which is composed of an operation code OP, and a source operand and destination operand addressing designation SRC-DEST.

Specific examples of operations of the conventional data processing apparatus having the above construction will be described hereinafter. The following operations are based on Instruction 1 and Instruction 2 which are instructions in the format shown in FIG. 6(a) for floating-point operations, in which source operands are external operands, and destination operands are floating-point data register operands, and Instruction 3 which is in the format shown in FIG. 6(b) for an integer operation, in which the source operand and destination operand are both register operands.

FIG. 2 is a timing chart showing operations of the conventional data processing apparatus, which shows instructions executed by the instruction fetch unit 51, instruction decode unit 52, operand fetch unit 53 and execution unit 54 at every clock cycles t1, t2 and so on.

Clock Cycle t1:
The instruction fetch unit 51 fetches Instruction 1 (1:IF).
Clock Cycle t2:
The instruction decode unit 52 decodes the first halfword in Instruction 1 (1-1:DEC).
Clock Cycle t3:
The operand fetch unit 53 fetches the source operand for Instruction 1 from the memory or the like in response to the result of decoding of the first halfword in Instruction 1 (1-1:OF). The instruction decode unit 52 decodes the second halfword in Instruction 1 (1-2:DEC). The instruction fetch unit 51 fetches Instruction 2 (2:IF).
Clock Cycle t4:
The operand fetch unit 53 just transfers the operation control data outputted from the instruction decode unit 52 to the execution unit 54 since the destination operand is a register operand. That is, no operation takes place in relation to external operand fetching (1-2:nop). The instruction decode unit 52 decodes the first halfword in Instruction 2 (2-1:DEC).
Clock Cycle t5:
The floating-point unit 54a of the execution unit 54 executes a first step of the floating-point operation based on Instruction 1 (1:FP). The operand fetch unit 53 fetches the source operand for Instruction 2 from the memory or the like in response to the result of decoding of the first halfword in Instruction 2 (2-1:OF). The instruction decode unit 52 decodes the second halfword in Instruction 2 (2-2:DEC). The instruction fetch unit 51 fetches Instruction 3 (3:IF).
Clock Cycle t6:
The floating-point unit 54a of the execution unit 54 executes a second step of the floating-point operation based on Instruction 1 (1:FP). The operand fetch unit 53 just transfers the operation control data outputted from the instruction decode unit 52 since the destination operand is a register operand (2-2:nop). The instruction decode unit 52 decodes Instruction 3 (3:DEC).
Clock Cycle t7:
The floating-point unit 54a of the execution unit 54 executes a first step of the floating-point operation based on Instruction 2 (2:FP). The operand fetch unit 53 just transfers the operation control data outputted from the instruction decode unit 52 since the source operand and destination operand are both register operands (3:nop).
Clock Cycle t8:
The floating-point unit 54a of the execution unit 54 executes a second step of the floating-point operation based on Instruction 2 (2:FP). Concurrently therewith, the integer unit 54b executes the integer operation based on Instruction 3 (3:INT).

As described above, Instruction 1, for example, is fetched at clock cycle t1, and the floating-point operation is completed at clock cycle t6. Where a pipelined architecture is employed to execute subsequent Instructions, 2 and 3, the units 51–55 operate concurrently to realize, in effect, a processing speed corresponding to two clock cycles per instruction.

Further, Instructions 2 and 3 may be completed simultaneously at clock cycle t8 by concurrently operating the floating-point unit 54a and integer unit 54b of the execution unit 54.

However, with a data processing apparatus having a pipelined structure, the improved processing speed due to the pipelined structure is not obtained when branching caused by a conditional jump, an unconditional jump, or a subroutine call occurs. That is, execution of a branch instruction instantly effects what is known as a pipeline flush, which invalidates the instructions already fetched and decoded and operands fetched from the memory. Subsequently, branched processing is carried out for fetching and decoding an instruction, fetching an operand, and executing the instruction. Until this instruction is executed, effective concurrent operations of the units 51–55 do not take place.

A penalty accompanying the pipeline flush increases with the number of pipeline stages.

In the conventional data processing apparatus described above, the operand fetch unit 53 fetches an operand in an independent pipeline stage. Thus, the conventional apparatus has a large number of pipeline stages, which results in the disadvantage of little improvement in the processing speed when branching instructions are executed frequently.

It will be futile not to employ the pipelined architecture for operand fetching and execution of arithmetic operations just in order to decrease the number of pipeline stages. It is because an execution could not be carried out until all the operands necessary for the execution are fetched, and operands for a next instruction could not be fetched until the execution currently in progress is completed. This results in a reduced processing speed regardless of whether a branching instruction is executed or not.

Further, when the floating-point unit 54a and integer unit 54b concurrently execute a preceding instruction and a succeeding instruction, an overflow and a trap of an execution exception related execution of the preceding instruction may occur. In such a case, the conventional data processing apparatus has a disadvantage of occasionally failing to effect proper exception processing and restart the succeeding instruction after the exception processing.

That is, when a trap due to an execution exception occurs with the preceding instruction and exception processing is carried out, resources such as an operand and stack pointer necessary for the exception processing may be rewritten by execution or operand fetching for the succeeding instruction proceeding concurrently with he preceding instruction. (The stack pointer may be rewritten only by fetching of an operand necessary for execution of the succeeding instruction.) In such a case, proper exception processing is not carried out.

The succeeding instruction executed concurrently with the preceding instruction must be executed all over again based on results of the exception processing. How ever, the succeeding instruction cannot be restarted properly if the operand or stack pointer is renewed by the first execution, that is if the succeeding instruction indicates the same address for reading and writing or calls for a stack operation.

A solution to this problem has been proposed in U.S. Pat. No. 4,879,676, for example. According to this technique, occurrence of an execution exception is predicted at a step of exponential processing carried out in an initial stage of a floating-point operation. Only when non-occurrence of an execution exception is assured, the remaining steps of the floating-point operation are executed concurrently with an integer operation on a succeeding instruction.

However, this technique requires large-scale hardware for predicting occurrence of an execution exception, resulting in a greatly increased hardware cost. In addition, the data processing apparatus must have an increased number of circuits, which makes it difficult to increase clock frequency and to increase processing speed to a large degree.

SUMMARY OF THE INVENTION

The object of the present invention is to provide a data processing apparatus and data processing method which avoids an increase in the number of pipeline stages, reduces the penalty accompanying a pipeline flush when branching takes place, and increases the processing speed.

The above object is fulfilled, according to the present invention, by a data processing apparatus having a pipelined architecture, comprising an instruction fetch unit for fetching an instruction from a memory; an instruction decode unit for decoding the instruction fetched by the instruction fetch unit, and outputting fetch control data regarding operand fetching and operation control data regarding execution of the instruction; an execution unit for receiving the operation control data directly from the instruction decode unit, and executing a predetermined operation based on the operation control data; and an operand fetch unit for receiving the fetch control data directly from the instruction decode unit, and fetching an operand from a source other than registers in the execution unit, wherein the operand fetch unit fetches the operand concurrently with processing in a second cycle, and subsequent cycles if any, of the operation executed by the execution unit and requiring at least two machine cycles for execution.

In the above construction, the execution unit receives the operation control data directly from the instruction decode unit for executing an operation, while the operand fetch unit receives the fetch control data directly from the instruction decode unit, and fetches an operand from a source other than the registers of the execution unit, such as an external memory, cache memory or I/O device, concurrently with processing in a second cycle, and subsequent cycles if any, of the operation executed by the execution unit and requiring at least two machine cycles for execution. Thus, the number of pipeline stages is reduced with the external operand fetching operation not forming one independent pipeline stage. Consequently, even when an instruction for branching is executed, the influences of a pipeline flush is suppressed to improve processing speed.

The above object is fulfilled also by a data processing method applicable to a processing apparatus having a pipelined architecture, comprising an instruction fetching step for fetching an instruction from a memory; an instruction decoding step for decoding the instruction fetched and outputting fetch control data regarding operand fetching and operation control data regarding execution of the instruction; an execution step for directly receiving the operation control data outputted a the instruction decoding step, and executing a predetermined operation based on the operation control data; and an operand fetching step for directly receiving the fetch control data outputted at the instruction decoding step, and fetching an operand from a source other than registers; wherein the operand fetch step is carried out concurrently with processing in a second cycle, and subsequent cycles if any, of the operation requiring at least two machine cycles for execution.

The present invention has another object to provide a data processing apparatus and data processing method which, when, in the course of concurrent execution of a preceding instruction and a succeeding instruction, a trap related results from an execution exception of the preceding instruction occurs, exception processing and restart of the succeeding instruction following the exception processing are effected properly, and which does not involve a substantial increase in the hardware scale.

The above object is fulfilled by a data processing apparatus having a pipelined architecture, comprising an instruction fetch unit for fetching an instruction from a memory; an instruction decode unit for decoding the instruction fetched by the instruction fetch unit, and outputting fetch control data regarding operand fetching and operation control data regarding execution of the instruction; an execution unit including a plurality of arithmetic units each having registers, each of the arithmetic units receiving the operation control data from the instruction decode unit, and executing a predetermined operation based on the operation control data, at least two arithmetic units being operable concurrently; an operand fetch unit for receiving the fetch control data from the instruction decode unit, and fetching an operand from a source other than registers in the execution units in accordance with the fetch control data, the operand fetch unit being operable concurrently with at least one of the arithmetic units; a trap activation enable data holding unit for holding data indicating that trap activation is enabled upon occurrence of an execution exception during execution of an operation by one of the arithmetic units; and a concurrent execution control unit responsive to the trap activation enable data holding unit to inhibit concurrent operation of the operand fetch unit and the arithmetic units.

In the above construction, the concurrent execution control unit,is operable in response to trap activation enable data to inhibit concurrent operation of the operand fetch unit and the arithmetic units. When exception processing is carried out by activating a trap, for example, the concurrent operation is inhibited to avoid update of resources such as operands and stack pointers necessary for execution of the exception processing and execution of a subsequent instruction, thereby assuring a proper execution of the exception processing and subsequent instruction. The concurrent operation is enabled for high speed processing when programs applied to the apparatus assure non-occurrence of execution exceptions or when occurrence of an execution exception does not require exception processing. All these are achieved without a substantial increase in the hardware scale.

The above object is fulfilled also by a data processing method applicable to a data processing apparatus having a pipelined architecture, comprising an instruction fetching step for fetching an instruction from a memory; an instruction decoding step for decoding the instruction fetched and outputting fetch control data regarding operand fetching and operation control data regarding execution of the instruction; an operand fetching step for receiving the fetch control data outputted at the instruction decoding step, and fetching an operand from a source other than registers; an execution step for causing each of a plurality of arithmetic portions to receive the operation control data outputted at the instruction decoding step, and causing one of the arithmetic portions corresponding to the operation control data received to execute a predetermined operation based on the operation control data, the operation being executed concurrently with the operand fetching and operations of other arithmetic portions; and a concurrent execution controlling step for inhibiting concurrent execution of the operand fetching step and the operation of the arithmetic portions in response to data for enabling trap activation upon occurrence of an execution exception at the operation step executed by one of the arithmetic portions.

BRIEF DESCRIPTION OF THE DRAWINGS

These and other objects, advantages and features of the invention will become apparent from the following description thereof taken in conjunction with the accompanying drawings which illustrate specific embodiments of the invention. in the drawings:

FIGS. 7, 8, 9, 10 and 11 are timing charts showing operations of the data processing apparatus.

DESCRIPTION OF THE PREFERRED EMBODIMENT

A data processing apparatus according to the present invention will be described with reference to FIG. 3. This apparatus is capable of floating-point operations as well as integer operations.

Figure 1:
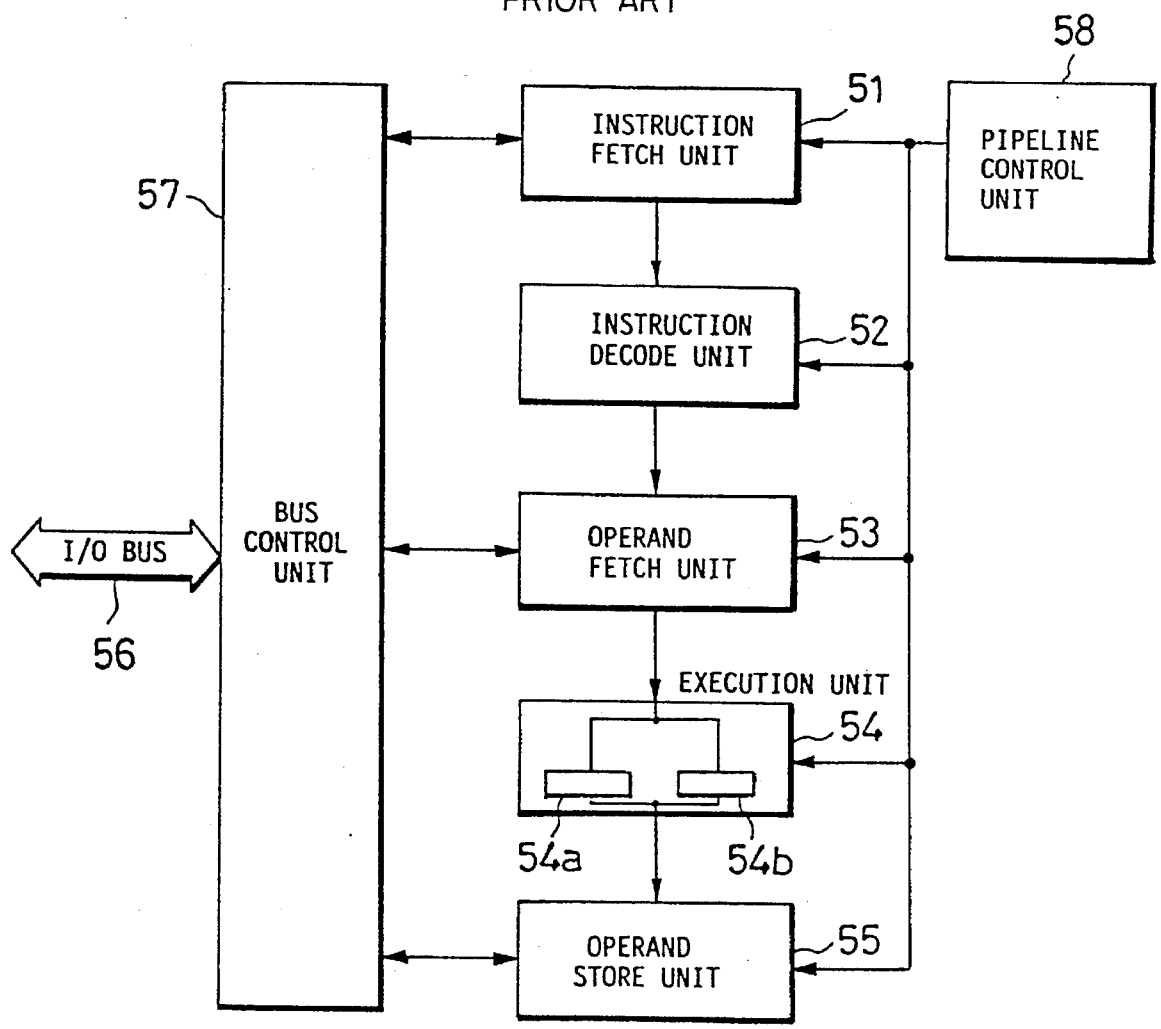
FIG. 1 a block diagram of a conventional data processing apparatus.
Figure 2:
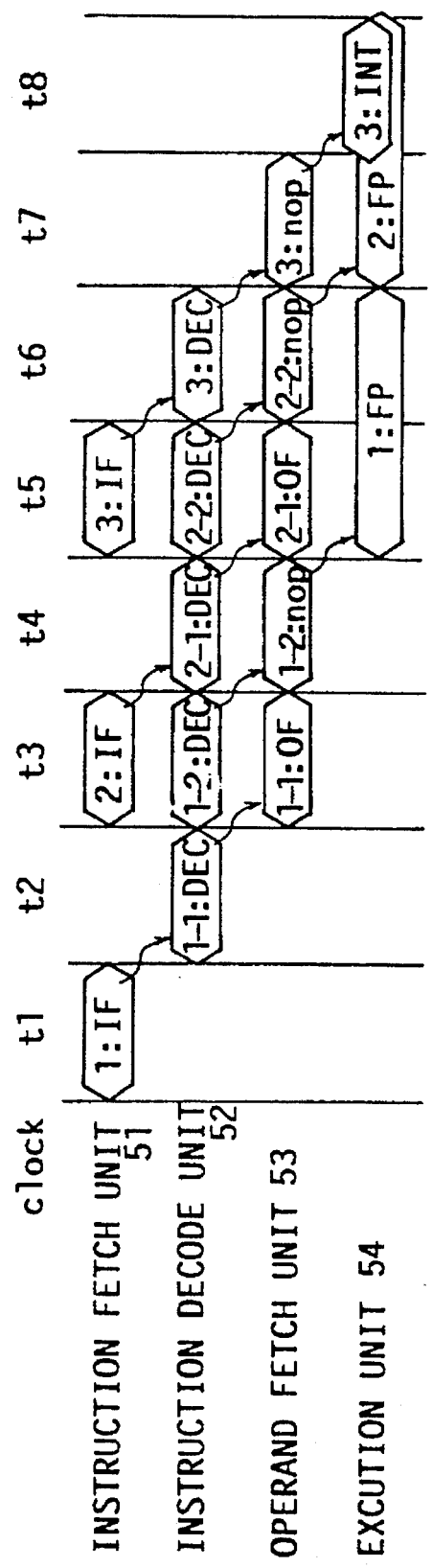
FIG. 2 is a timing chart showing operations of the conventional data processing apparatus.
Figure 3:
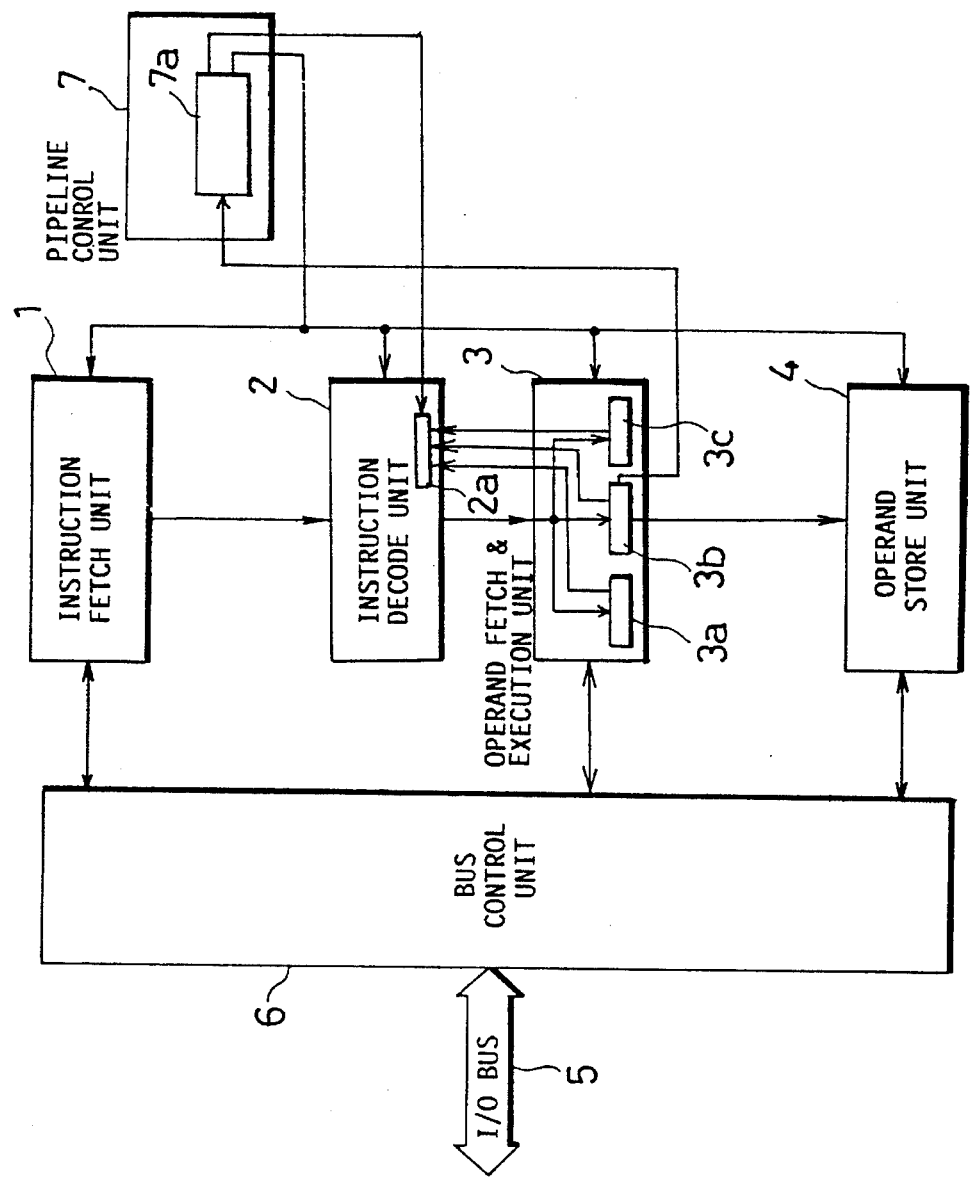
FIG. 3 is a block diagram of a data processing apparatus according to the present invention.

In FIG. 3:

Numeral 1 denotes an instruction fetch unit for fetching instruction codes stored in a memory not shown.

Numeral 2 denotes an instruction decode unit for decoding the instruction codes fetched and outputting control data.

Numeral 3 denotes an operand fetch and execution unit for fetching operands stored in a memory or I/O device not shown (hereinafter referred to as external operands) and carrying out floating-point operations and integer operations using the external operands and/or operands stored in general registers or floating-point data registers described later (hereinafter referred to as register operands).

Where the data processing apparatus has a cache memory, the above external operands include operands stored in the cache memory. Thus, the external operands refer to those operands fetched from devices other than the registers such as the general registers and floating-point registers.

Numeral 4 denotes an operand store unit for writing the external operands, that is writing results of operations to a memory or I/O device. Details and operations of the operand store unit 4 will be omitted from the following description.

Numeral 5 denotes an I/O bus for connecting the data processing apparatus to the memory, I/O device and the like.

Numeral 6 denotes a bus control unit for arbitrating an instruction code fetch request from the instruction fetch unit 1, an external operand fetch request from the operand fetch and execution unit 3, and an external operand write request from the operand store unit 4, and controlling the I/O bus 5.

The bus control unit 6 may include a buffer memory for holding instruction codes and external operands prefetched from the memory and external operands to be written to the memory, or a cache memory for carrying out similar operations. Where the I/O bus 5 is divided into an instruction bus and a data bus, it is unnecessary to arbitrate the instruction code fetch request and external operand fetch request or write request, and only the external operand fetch request and write request may be arbitrated.

An address conversion mechanism may be provided for the bus control unit 6, or the instruction fetch unit 1, operand fetch and execution unit 3 and operand store unit 4 to employ a virtual storage system.

Numeral 7 denotes pipeline control unit for controlling the units 1–4. These units 1–4 normally operate independently by exchanging control data, control data output enable signals and the like. However, special operations such as exception processing which will be described later are controlled by the pipeline control unit 7.

The instruction decode unit 2, specifically, decodes an instruction code fetched by the instruction fetch unit 1, and outputs a control data regarding execution of an operation (hereinafter referred to as operation control data) to the operand fetch and execution unit 3. When the decoded data shows a necessity for fetching an external operand, the instruction decode unit 2 computes an operand address and outputs a control data regarding external operand fetching (hereinafter referred to as fetch control data), along with the operation control data, to the operand fetch and execution unit 3. The fetch control data may include a data showing an operand size.

Specific examples of the control data outputted from the instruction decode unit 2 will be described hereunder.

When the instruction decode unit 2 determines from a result of decoding that the instruction indicates an integer operation requiring an external operand to be fetched, the instruction decode unit 2 successively outputs the fetch control data and operation control data regarding the integer operation to the operand fetch and execution unit 3.

When the instruction decode unit 2 determines that the instruction indicates an integer operation requiring no external operand to be fetched, that is an integer operation using register operands, the instruction decode unit 2 outputs only the operation control data regarding the integer operation to the operand fetch and execution unit 3. This operation control data includes a data identifying registers.

When the instruction decode unit 2 determines that the instruction indicates a floating-point operation requiring an external operand to be fetched, the instruction decode unit 2 successively outputs the fetch control data and operation control data regarding the floating-point operation to the operand fetch and execution unit 3.

When the instruction decode unit 2 determines that the instruction indicates a floating-point operation using register operands, the instruction decode unit 2 outputs only the operation control data regarding the floating-point operation to the operand fetch and execution unit 3.

The above control data are outputted at the timing controlled by the control data send control circuit 2a. Details of the timing will be described later.

Figure 4:
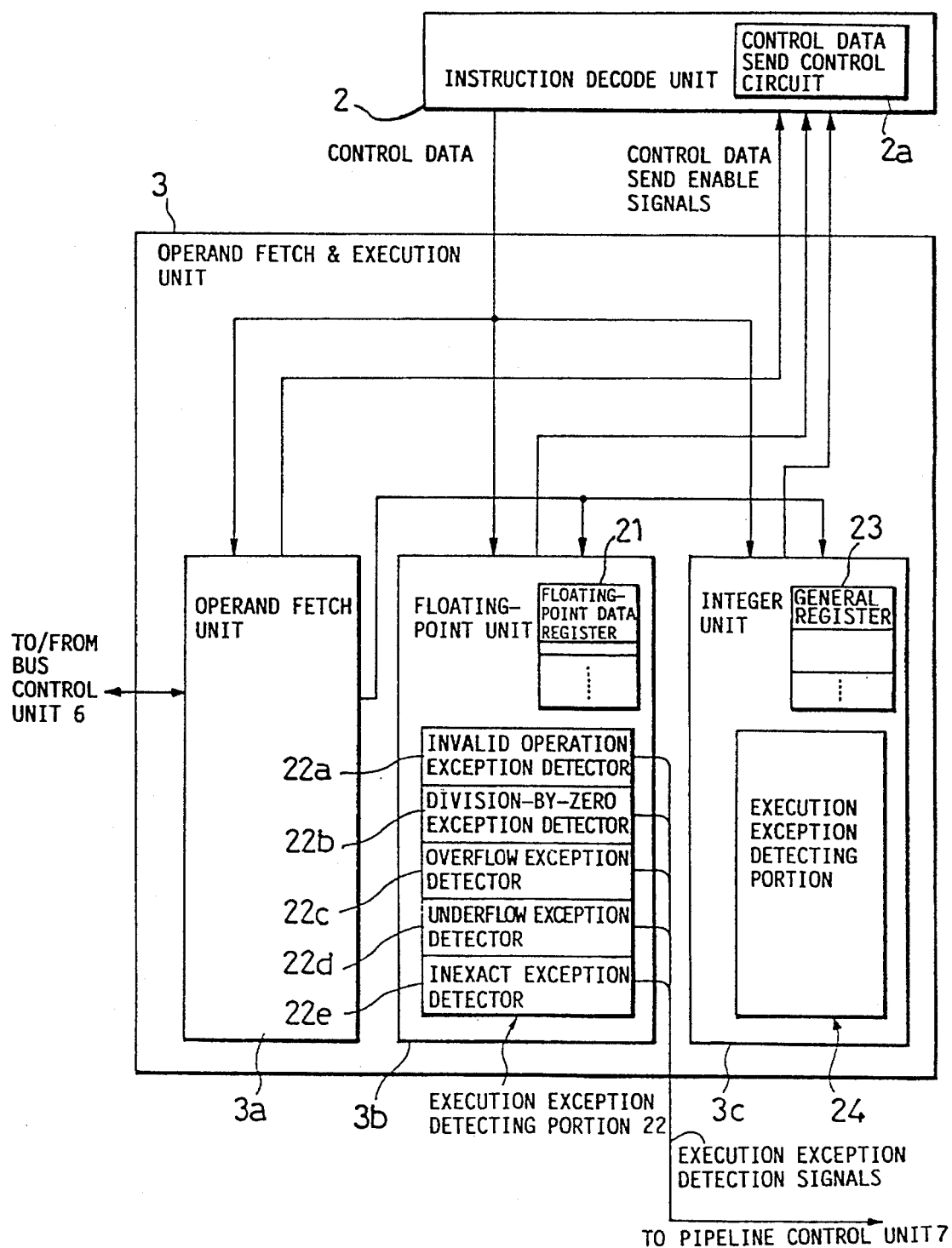
FIG. 4 is a block diagram showing details of an operand fetch and execution unit.

As shown in FIG. 4, the operand fetch and execution unit 3 includes an operand fetch unit 3a, a floating-point unit 3b and an integer unit 3c.

When a fetch control data is outputted from the instruction decode unit 2, the operand fetch unit 3a fetches an external operand based on an operand address included in the fetch control data, and transmits the external operand fetched to the floating-point unit 3b or integer unit 3c.

The floating-point unit 3b includes a plurality of floating-point data registers 21, and an execution exception detecting portion 22 for detecting execution exceptions of floating-point operations. When an operation control data regarding a floating-point operation is outputted from the instruction decode unit 2, the floating-point unit 3b carries out the floating-point operation using an external operand and/or register operand. Results of the operation are stored in the floating-point data registers 21 or outputted to the operand store unit 4 for writing to the memory or the like.

The execution exception detecting portion 22 includes an invalid operation exception detector 22a, a division-by-zero exception detector 22b, an overflow exception detector 22c, an underflow exception detector 22d and an inexact exception detector 22e, each of which outputs logic "1" upon detection of an execution exception.

The invalid operation exception detector 22a detects an invalid operation such as a square root of a negative number or subtraction of a positive infinite number from another. The division-by-zero exception detector 22b detects a division-by-zero. The overflow exception detector 22c detects an overflowing result of an operation. The underflow exception detector 22d detects an underflowing result of an operation. The inexact exception detector 22e detects a rounded result of an operation.

The integer unit 3c, as does the floating-point unit 3b, includes a plurality of general registers 23 and an execution exception detecting portion 24 for detecting execution exceptions of integer operations. When an operation control data regarding an integer operation is outputted from the instruction decode unit 2, the integer unit 3c carries out the integer operation. Results of the operation are stored in the general registers 23 or in the memory. Details and operations of the execution exception detecting portion 24 will be omitted from the following description.

The operand fetch and execution unit 3 may further include a decoder, not shown, for determining whether the control data outputted from the instruction decode unit 2 is a fetch control data for the operand fetch unit 3a, an operation control data regarding a floating-point operation for the floating-point unit 3b, or an operation control data regarding an integer operation for the integer unit 3c.

Figure 5:
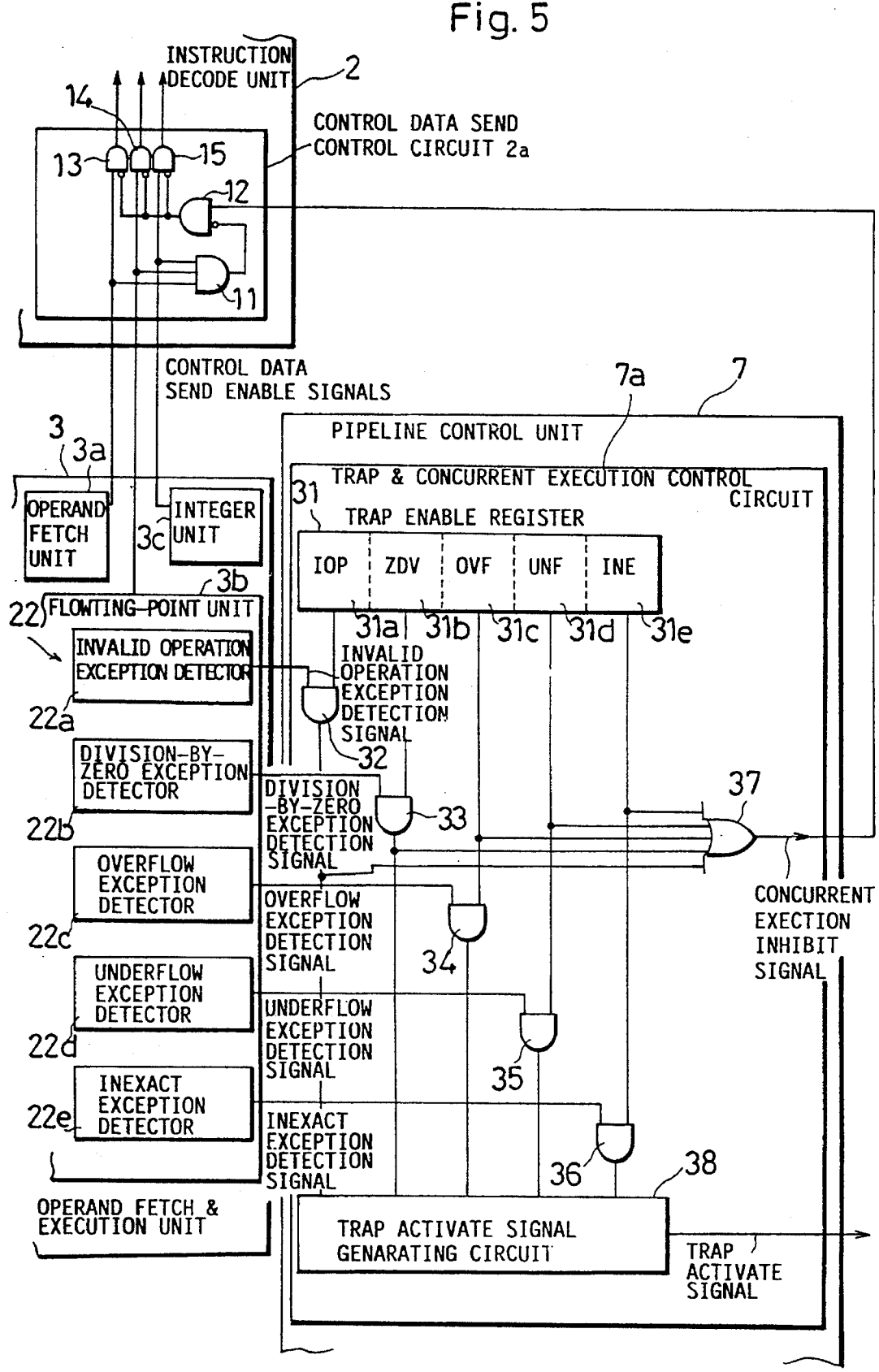
FIG. 5 is a block diagram showing details of a trap and concurrent execution control circuit.

As shown in FIG. 5, the pipeline control unit 7 includes a trap and concurrent execution control circuit 7a for controlling exception processing, and controlling enabling and disabling of concurrent execution. The trap and concurrent execution control circuit 7a includes a trap enable register 31, logical AND gates 32–36, a logical OR gate 37 and a trap activate signal generating circuit 38.

The trap enable register 31 holds information showing enabling of trap activation when an execution exception occurs during a floating-point operation, and includes an invalid operation exception trap enable bit (IOP) 31a, a division-by-zero exception trap enable bit (ZDV) 31b, an overflow exception trap enable bit (OVF) 31c, an underflow exception trap enable bit (UNF) 31d and an inexact exception trap enable bit (INE) 31e. Each of the trap enable bits 31a–31e enables the trap activation upon occurrence a corresponding execution exception by being set to logic "1", and inhibits the trap activation by being cleared to logic "0".

The trap activate signal generating circuit 38 outputs a trap activate signal when, in a trap activation enable state, an execution exception is detected by the execution exception detecting portion 22, to cause the instruction fetch unit 1 and others to effect a pipeline flush or to branch to an exception processing routine.

The information held by the trap enable register 31 are used also as information for enabling concurrent execution by the operand fetch unit 3a, floating-point unit 3b and integer unit 3c of the operand fetch and execution unit 3.

That is, when the trap enable bit 31a or 31b is set to logic "1" and an execution exception corresponding thereto is detected, or when at least one of the trap enable bits 31c–31e is set to logic "1", the logical OR gate 37 outputs a concurrent execution inhibit signal of logic "1" to the control data send control circuit 2a of the instruction decode unit 2.

The control data send control circuit 2a includes logical AND gates 11–15. When the logical OR gate 37 outputs the concurrent execution inhibit signal of logic "1", the control data send control circuit 2a masks control data send enable signals outputted from the respective units 3a–3c of the operand fetch and execution unit 3 to the instruction decode unit 2. Only when the operations of all the units 3a–3c are completed and the control data send enable signals outputted from these units 3a–3c all become logic "1", the control data send control circuit 2a cancels the masking and enables the control data to be sent from the instruction decode unit 2 to the operand fetch and execution unit 3.

The numbers of required clock cycles will be described next.

The following numbers of clock cycles are required for the foregoing units 1–3 to carry out a single process (with one machine cycle assumed to be one clock cycle):

(a) one clock cycle per word (32 bits) for the instruction fetch unit 1, (b) one clock cycle per halfword (16 bits) for the instruction decode unit 2, and (c) one clock cycle per one operand fetch, two clock cycles per floating-point operation to be executed, and one clock cycle per integer operation to be executed, for the operand fetch and execution unit 3. (However, the operand fetch, floating-point operation and integer operation may be executed concurrently when concurrent execution is enabled by the trap and concurrent execution control circuit 7a.)

Figure 6A:
FIGS. 6(a) and (b) are explanatory views showing examples of instruction formats for the data processing apparatus.

The instructions executed by the data processing apparatus have formats as shown in FIGS. 6(a) and (b), for example.

The instruction in the format shown in FIG. 6(a) has a length of two halfwords. The first halfword is composed of an operation code OP1 and a source operand addressing designation SRC. The second halfword is composed of an operation code OP2 and a destination operand addressing designation DEST.

Figure 6B:
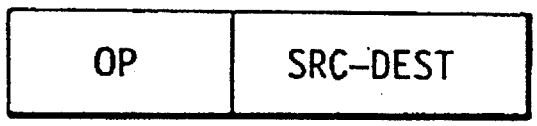

The instruction in the format shown in FIG. 6(b) has a length of one halfword, which is composed of an operation code OP, and a source operand and destination operand addressing designation SRC-DEST.

Specific examples of operations of the data processing apparatus having the above construction will be described hereinafter. The following operations are based on Instruction 1 and Instruction 2 which are instructions in the format shown in FIG. 6(a) for floating-point operations, in which source operands are external operands, and destination operands are floating-point data register operands, and Instruction 3 which is in the format shown in FIG. 6(b) for an integer operation, in which the source operand and destination operand are both register operands.

(A) When the trap enable register 31 is set as follows:

The invalid operation exception trap enable bit 31a is cleared to logic "0",

The division-by-zero exception trap enable bit 31b is cleared to logic "0",

The overflow exception trap enable bit 31c is cleared to logic "0",

The underflow exception trap enable bit 31d is cleared to logic "0", and

The inexact exception trap enable bit 31e is cleared to logic "0".

In this case, even if an execution exception occurs on

Instruction 1 or Instruction 2, the trap for executing exception processing is not activated but predetermined processing (e.g. outputting infinity upon occurrence of an overflow exception) is carried out, which is followed by execution of a next instruction.

The concurrent execution by the operand fetch and execution unit 3 is not inhibited, then an operand fetch and a floating-point or integer operation are carried out as soon as the instruction is decoded by the instruction decode unit 2.

FIG. 7 is a timing chart showing operations of the data processing apparatus, which shows instructions executed by the instruction fetch unit 1, instruction decode unit 2 and operand fetch and execution unit 3 at every clock cycles t1, t2 and so on. FIG. 7 also shows detecting operations of the detectors 22a–22e in the execution exception detecting portion 22 and states of signals in various parts of the data apparatus.

Clock Cycle t1:
The instruction fetch unit 1 fetches Instruction 1 (1:IF).

Clock Cycle t2:
The instruction decode unit 2 decodes the first halfword in Instruction 1, and outputs a fetch control data to the operand fetch unit 3a (1-1:DEC).

Clock Cycle t3:
The operand fetch unit 3a fetches the source operand for Instruction 1 from the memory or the like in response to the result of decoding of the first halfword in Instruction 1 (1-1:OF). The instruction decode unit 2 decodes the second halfword in Instruction 1, and outputs an operation control data to the floating-point unit 3b (1-2:DEC). The instruction fetch unit 1 fetches Instruction 2 (2:IF).

Clock Cycle t4:
The floating-point unit 3b executes a first step of the floating-point operation based on Instruction 1 (1:FP). At this time, the invalid operation exception detector 22a and division-by-zero exception detector 22b check to find an invalid operation exception and a division-by-zero exception in Instruction 1, respectively (1-1:DET). Presence or absence of these execution exceptions may be determined immediately upon start of the operation, and is therefore checked at the first step of the floating-point operation. However, exception processing and inhibition of the concurrent execution by the operand fetch and execution unit 3 are not effected even if an invalid operation exception and/or a division-by-zero exception is/are detected, since the trap enable bits 31a and 31b are cleared to logic "0".

The instruction decode unit 2 decodes the first halfword in Instruction 2 (2-1:DEC). At this time, the control data send enable signal of logic "1" is outputted since the operand fetch unit 3a is operable at the next clock cycle t5. With the concurrent execution inhibit signal being logic "0", this control data send enable signal is not masked by the control data send control circuit 2a. Consequently, the instruction decode unit 2 outputs a fetch control data to the operand fetch unit 3a.

Clock Cycle t5:
The floating-point unit 3b executes a second step of the floating-point operation based on Instruction 1 (1:FP). At this time, the overflow exception detector 22c, underflow exception detector 22d and inexact exception detector 22e check to find an overflow exception, an underflow exception and an inexact exception in Instruction 1, respectively (1-2:DET). That is, presence or absence of these execution exceptions is checked at the second step of the floating-point operation. However, exception processing is not effected even if an overflow exception, an underflow exception and/or an inexact exception is/are detected, since the corresponding trap enable bits 31c–31e are cleared to logic "0".

The operand fetch unit 3a fetches the source operand of Instruction 2 concurrently with the floating-point operation (2-1:OF). The instruction decode unit 2 decodes the second halfword in Instruction 2, and outputs an execution control data to the floating-point unit 3b (2-2:DEC). The instruction fetch unit 1 fetches Instruction 3 (3:IF).

Clock Cycle 6:
The floating-point unit 3b executes a first step of the floating-point operation based on Instruction 2 (2:FP). At this time, the invalid operation exception detector 22a and division-by-zero exception detector 22b check to find an invalid operation exception and a division-by-zero exception in Instruction 2, respectively (2-1:DET). However, as at clock cycle t4, exception processing and inhibition of the concurrent execution by the operand fetch and execution unit 3 are not effected even if an invalid operation exception and/or a division-by-zero exception is/are detected.

The instruction decode unit 2 decodes Instruction 3 (3:DEC). At this time, the control data send enable signal of logic "1" is outputted since the integer unit 3c is operable at the next clock cycle t7 With the concurrent execution inhibit signal being logic "0", this control data send enable signal is not masked by the control data send control circuit 2a. Consequently, the instruction decode unit 2 outputs an operation control data to the integer unit 3c.

Clock Cycle t7:
The floating-point unit 3b executes a second step of the floating-point operation based on Instruction 2 (2:FP). At this time, the overflow exception detector 22c, underflow exception detector 22d and inexact exception detector 22e check to find an overflow exception, an underflow exception and an inexact exception in Instruction 2, respectively (2-2:DET). However, exception processing is not effected even if an overflow exception is detected as shown in FIG. 7, since the overflow exception trap enable bits 31c is cleared to logic "0" to maintain the trap activate signal in logic "0". Consequently, the result of the operation becomes an infinity for example. The concurrent execution inhibit signal is also maintained in logic "0" thereby allowing subsequent concurrent processing, not illustrated, of the operand fetch and execution unit 3.

The integer unit 3c executes the integer operation on Instruction 3 concurrently with the second step of the floating-point operation on Instruction 2 above (3:INT).

Thus, execution of Instruction 1 is completed at clock cycle t5, and that of Instructions 2 and 3 at clock cycle t7.

The data processing apparatus is capable of high speed processing by setting the trap enable register 31 as noted above when programs applied to the apparatus assure non-occurrence of execution exceptions or when occurrence of an execution exception does not require exception processing.

(B) When, with the trap enable register 31 set as follows, an overflow exception (an execution exception for which the trap activation is not enabled) occurs:

The invalid operation exception trap enable bit 31a is cleared to logic "0",

The division-by-zero exception trap enable bit 31b is cleared to logic "0",

The overflow exception trap enable bit 31c is cleared to logic "0",

The underflow exception trap enable bit 31d is set to logic "1", and

The inexact exception trap enable bit 31e is cleared to logic "0".

Figure 8:
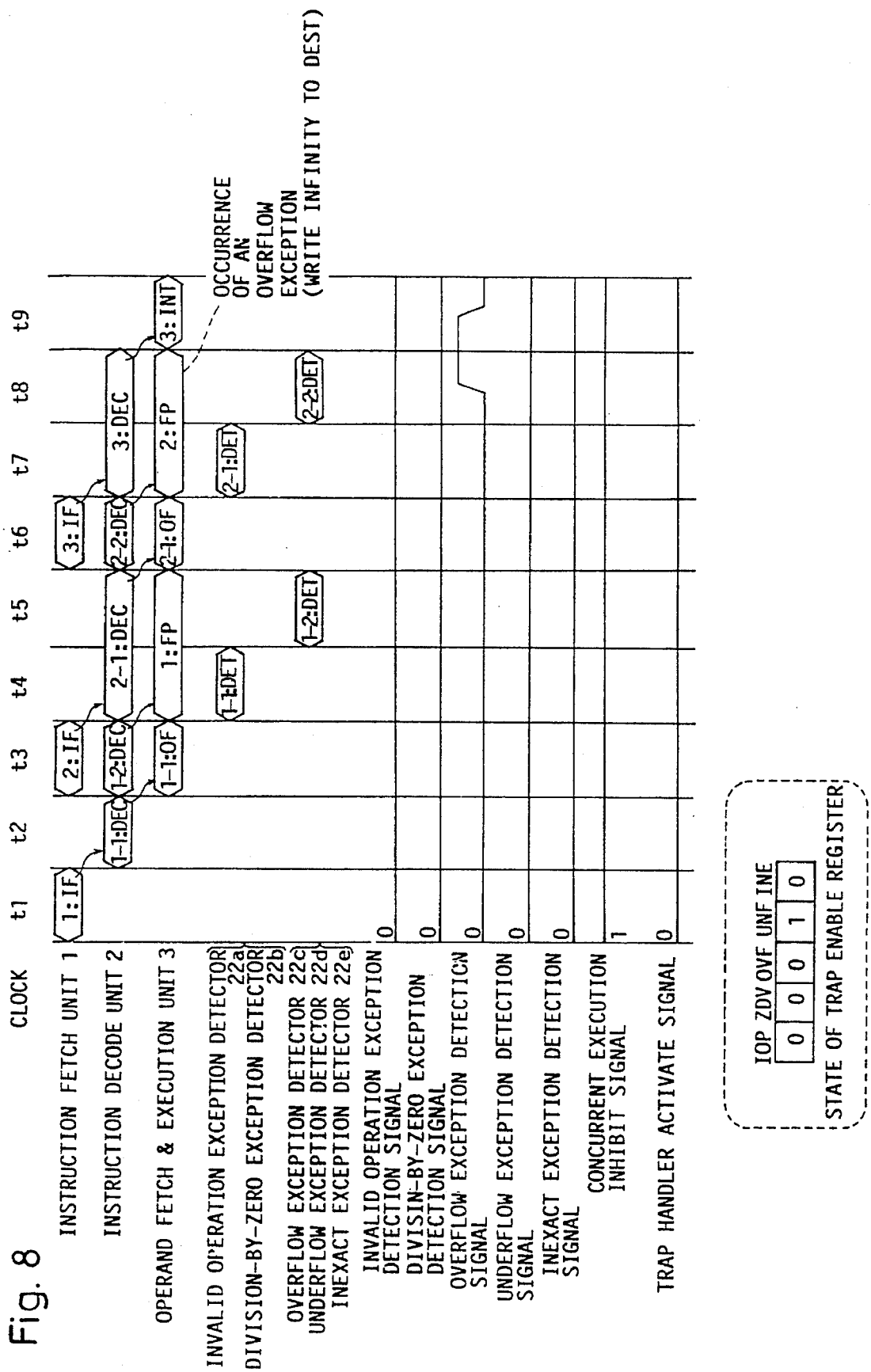

In this case, as shown in FIG. 8, the concurrent execution inhibit signal is always in logic "1" but the operations executed at clock cycles t1–t3 are the same as in (A) above.

Clock Cycle t4:

As in (A) above, the floating-point unit 3b executes the first step of the floating-point operation based on Instruction 1 (1:FP), while the invalid operation exception detector 22a and division-by-zero exception detector 22b check to find execution exceptions (1-1:DET). Exception processing is not effected even if an invalid operation exception and/or a division-by-zero exception is/are detected, since the corresponding trap enable bits 31a and 31b are cleared to logic "0".

The instruction decode unit 2 decodes the first halfword in Instruction 2 as in (A) (2-1:DEC) but, suspends output of the fetch control data to the operand fetch unit 3a. The reason is that, at this time, the control data send enable signal of logic "1" for operating the operand fetch unit 3a at the next clock cycle t5 is masked by the control data send control circuit 2a since the control data send enable signal of logic "0" (send inhibit) is outputted from the floating-point unit 3b, and the underflow exception trap enable bit 31d is set to logic "1" with the concurrent execution inhibit signal being logic "1". Consequently, the operand fetch unit 3a is inhibited from operating concurrently with the floating-point unit 3b at the next clock cycle t5.

Clock Cycle t5:

The floating-point unit 3b executes the second step of the floating-point operation based on Instruction 1 (1:FP). The overflow exception detector 22c, underflow exception detector 22d and inexact exception detector 22e check to find execution exceptions (1-2:DET). Exception processing is not effected since an overflow exception and/or an inexact exception is/are not detected.

When the floating-point unit 3b completes the floating-point operation and outputs the control data send enable signal of logic "1", the control data send enable signals from the operand fetch unit 3a, floating-point unit 3b and integer unit 3c all become logic "1". Masking of the control data send enable signals by the control data send control circuit 2a is canceled even if the concurrent execution inhibit signal is in logic "1". Consequently, the instruction decode unit 2 outputs the fetch control data for Instruction 2 decoded at clock cycle t4 to the operand fetch unit 3a.

Clock Cycle t6:

The operand fetch unit 3a fetches the source operand of Instruction 2 from the memory or the like in accordance with the fetch control data received from the instruction decode unit 2 (2-1:OF). The instruction decode unit 2 decodes the second halfword in Instruction 2, and outputs an operation control data to the floating-point unit 3b (2-2:DEC). The instruction fetch unit 1 fetches Instruction 3 (3:IF).

Clock Cycle t7:

The floating-point unit 3b executes the first step of the floating-point operation based on Instruction 2 (2:FP). At this time, the invalid operation exception detector 22a and division-by-zero exception detector 22b check to find an invalid operation exception and a division-by-zero exception in Instruction 2, respectively (2-1:DET). However, as at clock cycle t4, exception processing is not effected even if an invalid operation exception and/or a division-by-zero exception is/are detected.

The instruction decode unit 2 decodes Instruction 3 (3:DEC) but, as at clock cycle t4, suspends output of the operation control data to the integer unit 3c.

Clock Cycle t8:

The floating-point unit 3b executes the second step of the floating-point operation based on Instruction 2 (2:FP). The overflow exception detector 22c, underflow exception detector 22d and inexact exception detector 22e check to find execution exceptions (2-2:DET). However, exception processing is not effected even if an overflow exception is detected as shown in FIG. 8, since the overflow exception trap enable bits 31c is cleared to logic "0" to maintain the trap activate signal in logic "0".

When the floating-point unit 3b completes the floating-point operation and outputs the control data send enable signal of logic "1", masking of the control data send enable signals by the control data send control circuit 2a is canceled as at clock cycle t5. Consequently, the instruction decode unit 2 outputs the operation control data for Instruction 3 decoded at clock cycle t7 to the integer unit 3c. *Clock Cycle t9:*

The integer unit 3c executes the integer operation on Instruction 3 in accordance with the operation control data received from the instruction decode unit 2 (3:INT).

Thus, execution of Instructions 1, 2 and 3 is completed at clock cycles t5, t8 and t9, respectively.

(C) When, with the trap enable register 31 set as follows, an overflow exception (an execution exception for which the trap activation is enabled) occurs:

The invalid operation exception trap enable bit 31a is cleared to logic "0",

The division-by-zero exception trap enable bit 31b is cleared to logic "0",

The overflow exception trap enable bit 31c is set to logic "1",

The underflow exception trap enable bit 31d is cleared to logic "0", and

The inexact exception trap enable bit 31e is cleared to logic "0".

Figure 9:
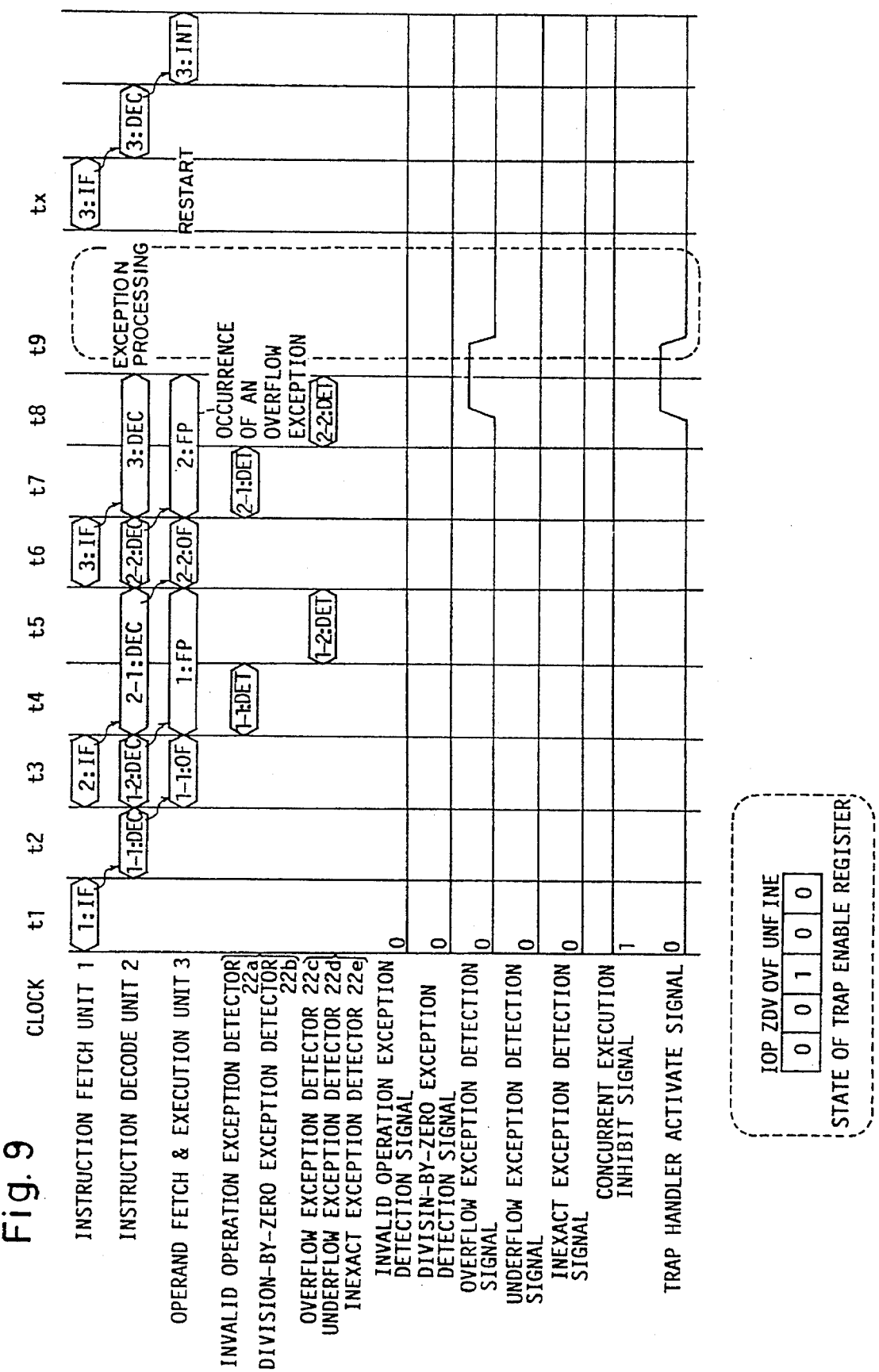

In this case, as shown in FIG. 9, the operations are the same as in (B) above before clock cycle t8 at which an overflow exception is detected. The concurrent execution inhibit signal also is always in logic "1".

Clock Cycle t8:

As in (B) above, the floating-point unit 3b executes the second step of the floating-point operation based on Instruction 2 (2:FP), while the overflow exception detector 22c, underflow exception detector 22d and inexact exception detector 22e check to find execution exceptions (2-2:DET). When an overflow is detected the floating-point operation as shown in FIG. 9, the trap activate signal becomes logic "1" since the overflow exception trap enable bits 31c is set to logic "1".

Clock Cycle t9:

When the trap activate signal in logic "1" is inputted to the operand fetch and execution unit 3 and others, the processing on Instruction 3 is discontinued and a trap is activated to carry out exception processing at clock cycle t9 et seq.

Clock Cycle tx:

Upon completion of the exception processing, the processing is restart under control of the pipeline control unit 7 whereby the instruction fetch unit 1 fetches Instruction 3 again.

With the overflow exception trap enable bit 31c set to logic "1" and the concurrent execution inhibit signal always in logic "1" to inhibit concurrent execution, the operation based on Instruction 3 has not taken place at a point of time an overflow is detected with the execution on Instruction 2 (the operation being canceled though the instruction is fetched and decoded ). The operation is executed only after completion of the exception processing. Thus, the exception processing and subsequent execution of Instruction 3 are carried out in accordance with resources such as proper operands and stack pointers.

(D) When, with the trap enable register 31 set as follows, an invalid operation exception does not occur:

The invalid operation exception trap enable bit 31a is set to logic "1",

The division-by-zero exception trap enable bit 31b is cleared to logic "0",

The overflow exception trap enable bit 31c is cleared to logic "0",

The underflow exception trap enable bit 31d is cleared to logic "0", and

The inexact exception trap enable bit 31e is cleared to logic "0".

Figure 10:
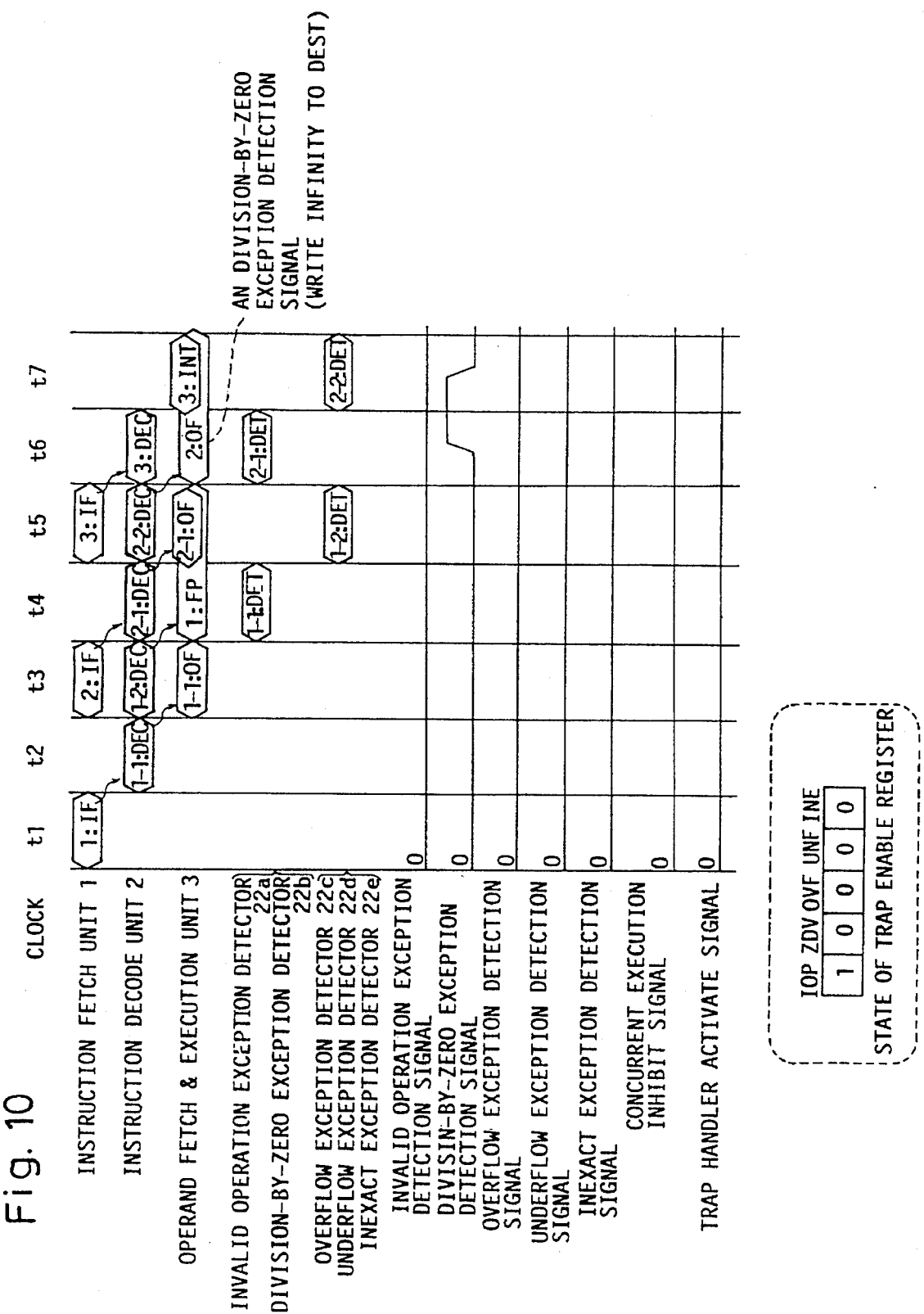

In this case, even if a division-by-zero exception occurs as shown in FIG. 10, exception processing is not effected since the division-by-zero trap enable bit 31b is cleared to logic "0" to maintain the trap activate signal in logic "0". Further, the concurrent execution inhibit signal is maintained in logic "0" to enable concurrent execution by the floating-point unit 3b and operand fetch unit 3a or integer unit 3c. Consequently, the operations are the same as in (A) above to carry out the predetermined processing, with an infinity regarded as a result of the division-by-zero, for example.

Thus, the data processing apparatus is capable of high speed processing by setting the trap enable register 31 as noted above when programs applied to the apparatus assure non-occurrence of execution exceptions other than an invalid operation exception or when exception processing is unnecessary in the event of execution exceptions other than an invalid operation exception. When an invalid operation exception occurs as in (E) below, exception processing is carried out reliably, and an instruction may be executed properly after the exception processing.

(E) When, with the trap enable register 31 set as follows, an invalid operation exception occurs:

The invalid operation exception trap enable bit 31a is set to logic "1",

The division-by-zero exception trap enable bit 31b is cleared to logic "0",

The overflow exception trap enable bit 31c is cleared to logic "0",

The underflow exception trap enable bit 31d is cleared to logic "0", and

The inexact exception trap enable bit 31e is cleared to logic "0".

In this case, the operations are the same as in (D) above up to clock cycle t5 as shown in FIG. 11.

Clock Cycle t6:

The floating-point unit 3b executes the first step of the floating-point operation based on Instruction 2 (2:FP). At this time, the invalid operation exception detector 22a and division-by-zero exception detector 22b check to find an invalid operation exception and a division-by-zero exception in Instruction 2, respectively (2-1 :DLT). When an invalid operation exception is detected with the floating-point operation as shown in FIG. 11, the concurrent execution inhibit signal and trap activate signal becomes logic "1" since the invalid operation exception trap enable bits 31a is set to logic "1".

The instruction decode unit 2 decodes Instruction 3 but suspends output of the operation control data to the integer unit 3c since the control data send enable signal from the integer unit 3c is masked.

Clock Cycle t7:

The floating-point unit 3b executes the second step of the floating-point operation based on Instruction 2 (2:FP). The overflow exception detector 22c, underflow exception detector 22d and inexact exception detector 22e check to find execution exceptions (2-2:DET).

Clock Cycle t8:

When the trap activate signal in logic "1" is inputted to the operand fetch and execution unit 3 and others, the processing on Instruction 3 is discontinued and a trap is activated to carry out exception processing at clock cycle t8 et seq.

Clock Cycle ty:

Upon completion of the exception processing, the 0 processing is restart under control of the pipeline control unit 7 whereby the instruction fetch unit 1 fetches Instruction 3 again.

In the data processing apparatus in this embodiment, as described above, the operand fetch unit 3a and floating-point unit 3b may be operated concurrently, with the instruction decode unit 2 outputting the operation control data directly to the floating-point unit 3b without passing it through the operand fetch unit 3a. Thus, the number of pipeline stages is reduced with the eternal operand fetching operation not forming one independent pipeline stage.

Further, according to this embodiment, the instruction decode unit 2 suspends output of the operation control data or fetch control data of a succeeding instruction until the floating-point unit 3b completes a current floating-point operation (a) when the trap enable register 31 shows at least one of trap activation enable at occurrence of an overflow exception, trap activation enable at occurrence of an underflow exception, and trap activation enable at occurrence of an inexact exception; (b) when an invalid operation exception is detected with the trap enable register 31 showing trap activation enable at occurrence of an invalid operation exception; or (c) when a division-by-zero exception is detected with the trap enable register 31 showing trap activation enable at occurrence of a division-by-zero exception. This stops concurrent execution by the floating-point unit 3b and operand fetch unit 3a or integer unit 3c, thereby avoiding damage due to influence of a succeeding instruction of resources such as operands and stack pointers necessary for exception processing resulting from an execution exception in the floating-point operation and for execution of an instruction following the exception processing.

In this embodiment, outputs of the invalid operation exception detector 22a and division-by-zero exception detector 22b and outputs of the invalid operation exception trap enable bit 31a and division-by-zero exception trap enable bit 31b are applied to the logical AND gates 32 and 33 to take ANDs thereof, respectively, for stopping the concurrent execution only when a trap is actually activated. However, when the trap enable register shows trap activation enable, the concurrent execution may be unconditionally stopped with the invalid operation exception and division-by-zero exception as in the case of the overflow exception, underflow exception and inexact exception.

The present invention is not limited in application to the described data processing apparatus capable of floating-point operations and integer operations. The same effect may be produced when the invention is applied to an apparatus for carrying out graphics processing, for example.

Further, the present invention is not limited to the data processing apparatus for executing information in the described formats, but may be applied to data processing apparatus for executing instructions in one byte, a plurality of words and various other formats.

The types of instructions executed by the data processing apparatus may include various instructions such as those for arithmetic operations, or transfer of operands between registers.

Although the present invention has been fully described by way of examples with references to the accompanying drawings, it is to be noted that various changes and modifications will be apparent to those skilled in the art. Therefore, unless such changes and modifications depart frown the scope of the present invention, they should be construed as being included therein.

What is claimed is:

1. A data processing apparatus having a pipelined architecture including at least an instruction fetch stage, an instruction decode stage, and a combined operand fetch and execution stage, the apparatus comprising:

instruction fetch means for fetching instructions from a memory;

instruction decode means for decoding instructions fetched by said instruction fetch means, said instruction decode means:

successively outputting an operand fetch command and an operation command when an instruction requires an operand fetch; and outputting only the operation command when an instruction is for an operation requiring no operand fetch;

execution means including a plurality of arithmetic units each of said arithmetic units having registers, each of said arithmetic units receiving the operation command corresponding to a first instruction from said instruction decode means, and executing a predetermined operation on said first instruction in the combined stage based on the operation command, at least two arithmetic units being operable concurrently;

operand fetch means for receiving the operand fetch command corresponding to a second instruction following the first instruction from said instruction decode means and for fetching an operand from a storage device other than registers in said arithmetic units in accordance with the operand fetch command, said operand fetch means fetching the operand in the combined stage during a second machine cycle and during any following machine cycles of an operation performed by the execution means on said first instruction requiring at least two machine cycles for execution, the number of pipeline stages being reduced so that a penalty associated with branching is commensurately reduced, said operand fetch means being capable of operation concurrently with at least one of said arithmetic units;

trap activation enable data holding means for holding data indicating that trap activation is enabled upon occurrence of an execution exception during execution of an operation by one of said arithmetic units; and concurrent execution control means responsive to said trap activation enable data holding means to inhibit concurrent operation of said operand fetch means and said arithmetic units.

2. The data processing apparatus of claim 1, wherein said concurrent execution control means inhibits the concurrent operation of said operand fetch means and said arithmetic units whenever said trap activation enable data holding means holds data for enabling the trap activation.

3. The data processing apparatus of claim 2, wherein the execution exception is at leas one of an invalid operation exception, a division-by-zero exception, an overflow exception, an underflow exception and an inexact exception.

4. The data processing apparatus of claim 1, wherein said concurrent execution control means operates, when said trap activation enable data holding means holds the data for enabling the trap activation and upon occurrence of an execution exception in a first clock cycle, to inhibit the concurrent operation in a next and subsequent clock cycles of said operand fetch means and said arithmetic units.

5. The data processing apparatus of claim 4, wherein the execution exception is at least one of an invalid operation exception and a division-by-zero exception.

6. The data processing apparatus of claim 1, wherein said concurrent execution control means operates to inhibit the concurrent operation of said operand fetch means and said arithmetic units by stopping output of the fetch control data and execution control data from said instruction decode means.

7. The data processing apparatus of claim 1, wherein said trap activation enable data holding means holds the data corresponding to a plural types of execution exceptions, for enabling the trap activation upon occurrence of each of the execution exceptions.

8. The data processing apparatus of claim 7, wherein said concurrent execution control means operates to inhibit the concurrent operation of said operand fetch means and said arithmetic units whenever said trap activation enable data holding means holds data for enabling the trap activation corresponding to a first one of the plural types of execution exceptions, and to inhibit the concurrent operation of said operand fetch means and said arithmetic units upon occurrence of a further pertinent execution exception when said trap activation enable data holding means holds data for enabling the trap activation corresponding to a second one of the plural types of execution exceptions.

9. The data processing apparatus of claim 8, wherein said second one of the plural types of execution exceptions is an execution exception in a first clock cycle of an operation of one of said arithmetic units based on one instruction.

10. The data processing apparatus of claim 9, wherein said second one of the plural types of execution exceptions is at least one of an invalid operation exception and a division-by-zero exception.

11. A data processing apparatus having a pipelined architecture, including at least an instruction fetch stage, an instruction decode stage, and a combined operand fetch and execution stage, the apparatus comprising:

instruction fetch means for fetching instructions;

instruction decode means for decoding instructions received from said instruction fetch means, said instruction decode means:

successively outputting an operand fetch command and an integer operation command when an instruction is for an integer operation requiring an operand fetch;

outputting only the integer operation command when an instruction is for an integer operation requiring no operand fetch;

successively outputting an operand fetch command and a floating-point operation command when an instruction is for a floating-point operation requiring an operand fetch; and outputting only the floating-point operation command when an instruction is for a floating-point operation requiring no operand fetch;

integer operation means including arithmetic units and registers for receiving the integer operation command directly from said instruction decode means, and executing the integer operation in the combined stage;

floating-point operation means including arithmetic units and registers for receiving the floating-point operation command directly from said instruction decode means, and executing the floating-point operation requiring at least two machine cycles for execution in the combined stage; and operand fetch means for receiving the operand fetch command directly from said instruction decode means, and fetching an operand from a storage device other than the registers possessed by said integer operation means and said floating-point operation means;

said instruction decode means outputting the operand fetch command upon decoding a first instruction for the floating-point operation and a second instruction for the integer operation succeeding a previous floating-point operation and requiring the operand fetch even if said floating-point operation means is in the process of executing the first floating-point operation, and said operand fetch means fetching in the combined stage the operand corresponding to the second instruction in parallel with execution of the second machine cycle and any machine cycles subsequent to the second machine cycle of the first floating-point operation, the number of pipeline stages being reduced so that a penalty associated with branching is commensurately reduced.

12. A data processing apparatus having a pipelined architecture including at least an instruction fetch stage, an instruction decode stage, and a combined operand fetch and execution stage, the apparatus comprising:

instruction fetch means for fetching instructions from a memory;

instruction decode means for decoding instructions fetched by said instruction fetch means, said instruction decode means:

successively outputting an operand fetch command and an operation command when an instruction requires an operand fetch; and outputting only the operation command when an instruction is for an operation requiring no operand fetch;

execution means having registers for receiving the operation command corresponding to a first instruction directly from said instruction decode means, and for executing a predetermined operation on said first instruction in the combined stage based on the operation command; and operand fetch means for receiving the operand fetch command corresponding to a second instruction following the first instruction directly from said instruction decode means and for fetching an operand from a storage device other than the registers in said execution means, said operand fetch means fetching the operand in the combined stage during a second machine cycle and during any following machine cycles of an operation performed by the execution means on said first instruction requiring at least two machine cycles for execution, the number of pipeline stages being reduced so that a penalty associated with branching is commensurately reduced.

13. The data processing apparatus of claim 12, wherein said operand fetch means includes first data validating means for validating only the fetch commands outputted from said instruction decode means, and said execution means includes second data validating means for validating only the operation commands outputted from said instruction decode means.

14. The data processing apparatus of claim 12, wherein said execution means includes a first arithmetic means for executing the operation requiring at least two machine cycles for execution, and a second arithmetic unit capable of operating concurrently with said first arithmetic unit.

15. The data processing apparatus of claim 14, wherein said first arithmetic unit executes a floating-point operation, and said second arithmetic unit executes an integer operation.

16. The data processing apparatus of claim 12, further comprising:

trap activation enable data holding means for holding data indicating that trap activation is enabled upon occurrence of an execution exception during execution of an operation by said execution means; and concurrent execution control means responsive to said trap activation enable data holding means to inhibit concurrent operation of said operand fetch means and said execution means.

17. A data processing apparatus having a pipelined architecture, including at least an instruction fetch stage, an instruction decode stage, and a combined operand fetch and execution stage, the apparatus comprising:

instruction decode means for decoding instructions fetched by an instruction fetch means, said instruction decode means:

successively outputting an operand fetch command and an integer operation command when an instruction is for an integer operation requiring an operand fetch;

outputting only the integer operation command when an instruction is for an integer operation requiring no operand fetch; and outputting a floating-point operation command when an instruction is for a floating-point operation;

floating-point operation means for receiving the floating-point operation command from the instruction decode means, and executing a floating-point operation in two or more machine cycles in the combined stage;

integer operation means having registers for receiving the operand fetch command from the instruction decode means and fetching an operand from a storage device other than said registers, and for receiving the integer operation command from the instruction decode means and executing an integer operation in the combined stage;

said instruction decode means outputting the operand fetch command upon decoding a first instruction for the floating-point operation and a second instruction for the integer operation succeeding a previous floating-point operation;

trap enable means for commanding a trap activation enable when an execution exception occurs in said floating-point operation means; and control means operable in response to commands from said trap enable means, for selectively effecting:

(a) a concurrent execution control to cause said integer operation means to fetch an operand and execute an integer operation in the combined stage based on the second instruction, said fetching occurring when said floating-point operation means is in the process of executing a floating-point operation based on the first instruction, the number of pipeline stages being reduced so that a penalty associated with branching is commensurately reduced; and (b) a non-concurrent execution control to cause said integer operation means to suspend fetching of the operand and execution of the integer operation based on the second instruction, until said floating-point operation means completes execution of the floating-point operation based on the first instruction.

18. The data processing apparatus of claim 17, wherein said control means operates to effect the concurrent execution control when said trap enable means commands a trap activation inhibition, and to effect the non-concurrent execution control when said trap enable means commands the trap activation enable.

19. The data processing apparatus of claim 17, wherein said trap enable means includes:

a first trap enable indicator for indicating the trap activation enable when an invalid operation exception occurs in said floating-point operation means;

a second trap enable indicator for indicating the trap activation enable when a division-by-zero exception occurs in said floating-point operation means;

a third trap enable indicator for indicating the trap activation enable when an overflow exception occurs in said floating-point operation means;

a fourth trap enable indicator for indicating the trap activation enable when an underflow exception occurs in said floating-point operation means; and a fifth trap enable indicator for indicating the trap activation enable when an inexact exception occurs in said floating-point operation means.

20. The data processing apparatus of claim 19, wherein said control means operates to effect the concurrent execution control when all of the first to fifth trap enable indicators indicate a trap activation inhibition, and to effect the non-concurrent execution control when at least one of the first to fifth trap enable indicators indicates the trap activation enable.

21. The data processing apparatus of claim 19, further comprising:

invalid operation exception detection means for detecting occurrence of the invalid operation exception in said floating-point operation means; and division-by-zero exception detecting means for detecting occurrence of the division-by-zero exception in said floating-point operation means;

wherein said control means operates to effect the concurrent execution control:

in at least one of cases in which said first trap enable indicator indicates a trap activation inhibition and said invalid operation detecting means fails to detect occurrence of the invalid operation exception;

in at least one of cases in which said second trap enable indicator indicates the trap activation inhibition and said division-by-zero detecting means fails to detect occurrence of the division-by-zero exception; and in a case in which all of the third to fifth trap enable indicators indicate the trap activation inhibition; and to effect the non-concurrent execution control in at least one of cases in which:

said first trap enable indicator indicates the trap activation enable and said invalid operation detecting means detects occurrence of the invalid operation exception;

said second trap enable indicator indicates the trap activation enable and said division-by-zero detecting means detects occurrence of the division-by-zero exception; and at least one of the third to fifth trap enable indicators indicates the trap activation enable.

22. A data processing method applicable to a data processing apparatus having a pipelined architecture including at least an instruction fetch stage, an instruction decode stage, and a combined operand fetch and execution stage, the method comprising the step of:

(a) fetching instructions from a memory;

(b) decoding the instructions fetched in said step (a), said decoding step comprising the substeps of:

successively outputting an operand fetch command and an operation command when an instruction requires an operand fetch; and outputting only the operation command when an instruction is for an operation requiring no operand fetch;

(c) directly receiving the operation command outputted in said step (b) that corresponds to a first instruction, and executing a predetermined operation on said first instruction in the combined stage based on the operation command; and (d) directly receiving the operand fetch command outputted in said step (b) that corresponds to a second instruction, and fetching an operand from a storage device other than the registers in the data processing apparatus, said step (d) only being carried out in the combined stage after a first machine cycle of an operation performed during said step (c) on said first instruction requiring two or more machine cycles for execution, the number of pipeline stages being reduced so that a penalty associated with branching is commensurately reduced.

23. A data processing method applicable to a data processing apparatus having a pipelined architecture including at least an instruction fetch stage, an instruction decode stage, and a combined operand fetch and execution stage, the method comprising the steps of:

(a) fetching instructions from a memory;

(b) decoding instructions fetched in said step (a), said decoding step comprising the substeps of:

successively outputting an operand fetch command and an operation command when an instruction requires an operand fetch; and outputting only the operation command when an instruction is for an operation requiring no operand fetch;

(c) directly receiving the operation command outputted in said step (b) that corresponds to a first instruction, and executing a predetermined operation on said first instruction in the combined stage based on the operation command;

(d) receiving the operand fetch command outputted in said step (b) that corresponds to a second instruction, and fetching an operand from a storage device other than registers in the data processing apparatus, said step (d) being carried out in the combined stage after a first machine cycle of an operation performed during said step (c) on said first instruction requiring two or more machine cycles for execution, the number of pipeline stages being reduced so that a penalty associated with branching is commensurately reduced;

(e) causing each of a plurality of arithmetic portions to receive the operation command outputted in said step (b), and causing one of said arithmetic portions corresponding to the received operation command to execute a predetermined operation based on the received operation command, the operation being executed concurrently with the operand fetching and operations of other arithmetic portions, the number of pipeline stages being reduced so that a penalty associated with branching is commensurately reduced; and (f) inhibiting concurrent execution of said step (d) and the operation of said arithmetic portions, in response to data for enabling trap activation upon occurrence of an execution exception on said step (e) executed by one of the arithmetic portions.

24. The data processing method of claim 23, wherein said step (e) is executed to inhibit the concurrent execution of said step (c) and the operation of said arithmetic units whenever the data for enabling the trap activation is maintained.

25. The data processing method of claim 23, wherein said step (e), when the data for enabling the trap activation is held and upon occurrence of an execution exception detectable in a first clock cycle, inhibits the concurrent execution in a next and subsequent clock cycles of the operand fetching and the operation of said arithmetic units.

26. A data processing method of claim 23, wherein the data for enabling the trap activation corresponds to a plural types of execution exceptions, and enables the trap activation upon occurrence of each of the execution exceptions.

27. The data processing method of claim 26, wherein said step (e) inhibits the concurrent execution of said step (c) and said step (d) of said arithmetic units whenever data for enabling the trap activation corresponding to a first one of the plural types of execution exceptions is held, and inhibits the concurrent execution of said step (c) and said step (d) of said arithmetic units upon occurrence of a further pertinent execution exception when data for enabling the trap activation corresponding to a second one of the plural types of execution exceptions is held.

28. A data processing method applicable to a data processing apparatus having a pipelined architecture including at least an instruction fetch stage, an instruction decode stage, and a combined operand fetch and execution stage, the method comprising the steps of:

(a) decoding instructions fetched from a memory, said decoding step comprising the substeps of:
successively outputting an operand fetch command and an integer operation command when an instruction is for an integer operation requiring an operand fetch;
outputting only the integer operation command when an instruction is for an integer operation requiring no operand fetch; and
outputting a floating-point operation command when an instruction is for a floating-point operation;

(b) receiving the floating point operation command and executing a floating-point operation in two or more machine cycles;

(c) receiving the operand fetch command and fetching an external operand from a storage device other than registers in the data processing apparatus and executing an integer operation in the combined stage,
said decoding step including the substeps of outputting the operand fetch command upon decoding a first instruction for the floating-point operation and a second instruction for the integer operation succeeding a previous floating-point operation;

(d) commanding a trap activation enable upon occurrence of an execution exception; and (e) selectively effecting, in response to commands provided in said step (d):

(1) a concurrent execution control to fetch an operand and execute an integer operation in the combined stage, based on the second instruction, said fetching occurring during execution of a floating-point operation based on the first instruction, the number of pipeline stages being reduced so that a penalty associated with branching is commensurately reduced; and (2) a non-concurrent execution control to suspend fetching of the operand and execution of the integer operation, based on the second instruction until completion of the floating-point operation based on the first instruction.

29. The data processing of claim 28, wherein the trap enable commands provided said step (e), include:

a first trap enable command for indicating the trap activation enable upon occurrence of an invalid operation exception;

a second trap enable command for indicating the trap activation enable upon occurrence of a division-by-zero exception;

a third trap enable command for indicating the trap activation enable upon occurrence of an overflow exception;

a fourth trap enable command for indicating the trap activation enable upon occurrence of an underflow exception; and a fifth trap enable command for indicating the trap activation enable upon occurrence of an inexact exception.

30. The data processing method of claim 29, wherein said step (d) effects the concurrent execution control when all of the first to fifth trap enable commands indicate a trap activation inhibition, and to effect the non-concurrent execution control when at least one of the first to fifth trap enable commands indicates the trap activation enable.

31. The data processing method of claim 29, the method further comprising the steps of:

(e) detecting occurrence of the invalid operation exception at said step (a); and (f) detecting occurrence of the division-by-zero exception at said step (a);

wherein said step (d) effects the concurrent execution control:
in at least one of cases in which said first trap enable command indicates a trap activation inhibition and said step (e) fails to detect occurrence of the invalid operation exception;
in at least one of cases in which said second trap enable command indicates the trap activation inhibition and said division-by-zero detecting step fails to detect occurrence of the division-by-zero exception; and
in a case in which all of the third to fifth trap enable commands indicate the trap activation inhibition; and to effect the non-concurrent execution control in at least one of cases in which:
said first trap enable command indicates the trap activation enable and said step (e) detects occurrence of the invalid operation exception;
said second trap enable command indicates the trap activation enable and said division-by-zero detecting step detects occurrence of the division-by-zero exception; and
at least one of the third to fifth trap enable commands indicates the trap activation enable.

32. A data processing apparatus having a pipelined architecture including at least an instruction fetch stage, an instruction decode stage outputting operand fetch control data and operation control data, and a combined stage where operand fetch of a current instruction and execution of a preceding instruction are both performed, the data processing apparatus comprising:

execution means having registers for receiving the operation control data corresponding to the preceding instruction directly from said instruction decode means, said instruction decode stage successively outputting operand fetch control data and operation control data when an instruction is for an operation requiring an operand fetch and outputting only the operation control data when an instruction is for an operation requiring no operand fetch, and for executing a predetermined operation, requiring at least two machine cycles for execution, on said preceding instruction based on the received operation control data; and operand fetch means for receiving the operand fetch control data corresponding to the current instruction directly from said instruction decode means and for fetching an operand from a storage device other than the registers in said execution means, said operand fetch means fetching the operand in the combined stage after a first machine cycle of an operation performed by the execution means on said preceding instruction, the number of pipeline stages being reduced so that a penalty associated with branching is commensurately reduced.

33. A data processing apparatus having a pipelined architecture including at least an instruction fetch stage, an instruction decode stage, and a combined operand fetch and execution stage that reduces the number of pipeline stages so that a penalty associated with branching is commensurately reduced, the apparatus comprising:

instruction fetch means for fetching a first instruction from a memory;

instruction decode means for decoding said first instruction fetched by said instruction fetch means, said instruction decode means successively outputting operand fetch control data and operation control data when an instruction is for an operation requiring an operand fetch and outputting only the operation control data when an instruction is for an operation requiring no operand fetch; and operand fetch means for receiving the fetch control data directly from said instruction decode means and for fetching an operand; and execution means having registers for receiving the operation control data corresponding to a first instruction directly from said instruction decode means, and for executing a predetermined operation on said first instruction in the combined stage based on the operation control data, said predetermined operation requiring at least two machine cycles for execution;

said operand fetch means receiving fetch control data corresponding to a second instruction, and fetching an operand in the combined stage from a storage device other than the registers in said execution means after the first machine cycle of the predetermined operation, the number of pipeline stages being reduced so that a penalty associated with branching is commensurately reduced.

* * * * *